United States Patent
Harrow et al.

(10) Patent No.: US 7,385,940 B1
(45) Date of Patent: Jun. 10, 2008

(54) SYSTEM AND METHOD FOR USING A PLURALITY OF PROCESSORS TO SUPPORT A MEDIA CONFERENCE

(75) Inventors: Joseph C. Harrow, San Ramon, CA (US); Kai C. Kwong, Los Altos, CA (US); Ken J. Ju, Cupertino, CA (US); Son H. P. Le, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/465,236

(22) Filed: Dec. 15, 1999

(51) Int. Cl.
*H04L 12/16* (2006.01)
(52) U.S. Cl. .................. 370/267; 370/204; 379/202.01
(58) Field of Classification Search ................ 370/260, 370/261, 262, 263, 264, 265, 266, 267, 268, 370/269, 356, 352, 271; 709/204, 250; 379/201, 379/202.01, 203.01, 205.1
See application file for complete search history.

(56) References Cited

U.S. PATENT DOCUMENTS

| | | | |
|---|---|---|---|
| 4,665,514 A | 5/1987 | Ching et al. ................... 370/60 |
| 4,771,425 A | 9/1988 | Baran et al. ................... 370/85 |
| 4,819,228 A | 4/1989 | Baran et al. ................... 370/85 |
| 4,903,261 A | 2/1990 | Baran et al. ................. 370/94.2 |
| 4,920,565 A * | 4/1990 | Strawczynski et al. ..... 380/257 |
| 5,020,098 A * | 5/1991 | Celli ..................... 379/202.01 |
| 5,434,913 A * | 7/1995 | Tung et al. ............. 379/202.01 |
| 5,473,363 A * | 12/1995 | Ng et al. .................. 348/14.09 |
| 5,495,522 A * | 2/1996 | Allen .......................... 379/202 |
| 5,506,954 A * | 4/1996 | Arshi et al. .................. 345/501 |
| 5,524,110 A | 6/1996 | Danneels et al. .............. 370/62 |
| 5,526,353 A | 6/1996 | Henley et al. ............. 370/60.1 |
| 5,675,392 A * | 10/1997 | Nayebi et al. .............. 348/584 |
| 5,774,857 A | 6/1998 | Newlin ....................... 704/271 |
| 5,793,415 A * | 8/1998 | Gregory et al. ............ 348/14.1 |
| 5,841,763 A * | 11/1998 | Leondires ................... 370/260 |
| 5,867,653 A * | 2/1999 | Aras .......................... 709/204 |
| 5,909,431 A * | 6/1999 | Kuthyar et al. ............. 370/260 |
| 6,141,597 A * | 10/2000 | Botzko et al. ................ 700/94 |
| 6,181,786 B1 * | 1/2001 | Detampel ................... 379/205 |
| 6,418,214 B1 * | 7/2002 | Smythe .................... 379/202.1 |
| 6,453,470 B1 * | 9/2002 | Gazda et al. ............... 717/174 |
| 6,457,043 B1 * | 9/2002 | Kwak ......................... 709/204 |
| 6,463,414 B1 * | 10/2002 | Su et al. .................. 704/270.1 |
| 6,532,218 B1 * | 3/2003 | Shaffer ....................... 370/260 |

(Continued)

OTHER PUBLICATIONS

Cisco Systems, "System Description for the Cisco Communications Network," Version 2.1, 3 pages, Jan. 1999.

*Primary Examiner*—Chi Pham
*Assistant Examiner*—Kevin Mew
(74) *Attorney, Agent, or Firm*—Baker Botts L.L.P.

(57) ABSTRACT

A system for using a plurality of processors to support a media conference includes a mixing processor and a first media transformation processor coupled to the mixing processor. The mixing processor mixes input media information associated with two or more first participants to generate output media information for communication to a second participant. The first media transformation processor receives the output media information from the mixing processor, encodes the output media information to generate an output data stream, and communicates the output data stream to the second participant's end-user device.

21 Claims, 4 Drawing Sheets

U.S. PATENT DOCUMENTS

| | | | |
|---|---|---|---|
| 6,539,087 B1 * | 3/2003 | Walsh | 39/202.1 |
| 6,584,077 B1 * | 6/2003 | Polomski | 370/263 |
| 6,606,306 B1 * | 8/2003 | Lin | 370/261 |
| 6,625,271 B1 * | 9/2003 | O'Malley et al. | 379/202.01 |
| 6,775,247 B1 * | 8/2004 | Shaffer et al. | 370/260 |
| 6,985,571 B2 * | 1/2006 | O'Malley et al. | 379/202.01 |
| 7,113,992 B1 * | 9/2006 | Even | 709/227 |
| 2002/0069074 A1 * | 6/2002 | Eidson et al. | 704/500 |
| 2007/0132844 A1 * | 6/2007 | Katz | 348/140 |

* cited by examiner

| MEDIA CONFERENCE IDENTIFIER (72) | PARTICIPANT IDENTIFIERS (74) | DECODING PROCESSOR (76) | MIXING PROCESSOR (78) | ENCODING PROCESSOR (80) | CODING STANDARD (82) |
|---|---|---|---|---|---|
| 1 | 15.2.48.147<br>96.68.75.15<br>163.45.87.2<br>222.154.2.14 | MT 1<br>MT 1<br>MT 3<br>MT 3 | MIX 2 | MT 1<br>MT 1<br>MT 4<br>MT 4 | G.711<br>G.711<br>G.729<br>G.729 |
| 4 | 12.69.158.3<br>35.79.2.198<br>63.58.158.6 | MT 2<br>MT 2<br>MT 6 | MIX 1 | MIX 1<br>MT 5<br>MT 6 | G.723<br>G.723<br>G.711 |
| ⋮ | ⋮ | ⋮ | ⋮ | ⋮ | ⋮ |
| 2 | 6.8.45.168<br>15.26.254.2<br>224.36.56.98 | MIX 3<br>MIX 3<br>MT 7 | MIX 3 | MT 7<br>MT 7<br>MT 7 | G.729<br>G.729<br>G.729 |

SYSTEM AND METHOD FOR USING A PLURALITY OF PROCESSORS TO SUPPORT A MEDIA CONFERENCE

TECHNICAL FIELD OF THE INVENTION

This invention relates to the field of telecommunications and, more particularly, to a system and method for using a plurality of processors to support a media conference.

BACKGROUND OF THE INVENTION

A media conference is a real-time or near real-time communication among three or more participants. Conferencing devices may support media conferences over a packet-based network. A conferencing device receives input data packets from the participants' end-user devices, processes the input data packets to generate output data packets, and communicates the output data packets to the participants' end-user devices.

Unfortunately, current conferencing devices allocate a media conference to a single processor with a limited amount of resources to devote to the media conference. As a result, current conferencing devices typically restrict the size of a media conference application according to a processor's memory, processing, or other resources. Without such a restriction, the media conference application could exhaust the processor's limited resources, resulting in substantial delays and performance degradations. Hardware and software developers need a system that supports a media conference application without restricting the size of the application based on a single processor's limited resources.

SUMMARY OF THE INVENTION

In accordance with the present invention, a system and method for using a plurality of processors to support a media conference is provided that substantially eliminates or reduces disadvantages or problems associated with previously developed systems and methods.

In one embodiment, an apparatus for using a plurality of processors to support a media conference includes a mixing processor and a first media transformation processor coupled to the mixing processor. The mixing processor mixes input media information associated with two or more first participants to generate output media information for communication to a second participant. The first media transformation processor receives the output media information from the mixing processor, encodes the output media information to generate an output data stream, and communicates the output data stream to the second participant's end-user device.

In another embodiment, a system resource management (SRM) module is coupled to one or more media transformation processors and one or more mixing processors in a conferencing device. The SRM module receives a request to support a media conference and, in response, allocates the media conference to at least a first media transformation processor and a mixing processor. The mixing processor mixes input media information associated with two or more participants in the media conference to generate output media information, and the first media transformation processor encodes the output media information to generate an output data stream for communication to a participant in the media conference.

In another embodiment, a system for using a plurality of processors to support a media conference includes end-user devices and a conferencing device. The end-user devices and the conferencing device are coupled to a data network. The end-user devices generate input media information, encode the input media information to generate input data streams, and communicate the input data streams using the data network. The conferencing device includes two or more processors that decode the input data streams to generate the input media information, mix the input media information to generate output media information, and encode the output media information to generate output data streams. The end-user devices receive the output data streams and decode the output data streams to generate output media information.

Technical advantages of the present invention include a system and method for using a plurality of processors to support a media conference. By dividing the processing of a media conference among more than a single processor, a conferencing device may support larger media conferences without causing performance degradations that interfere with the real-time quality of the media conferences. The multi-processor solution also provides an extensible modular architecture. In addition, using media transformation processors, a conferencing device may support more processing-intensive coding standards that facilitate communication of data streams over a data network. The following description, figures, and claims further describe the present invention, including its features, functions, and technical advantages.

BRIEF DESCRIPTION OF THE DRAWINGS

FIG. 4 illustrates a table that includes status information relating to the media conferences supported by the conferencing device.

DETAILED DESCRIPTION OF THE DRAWINGS

Figure 1:
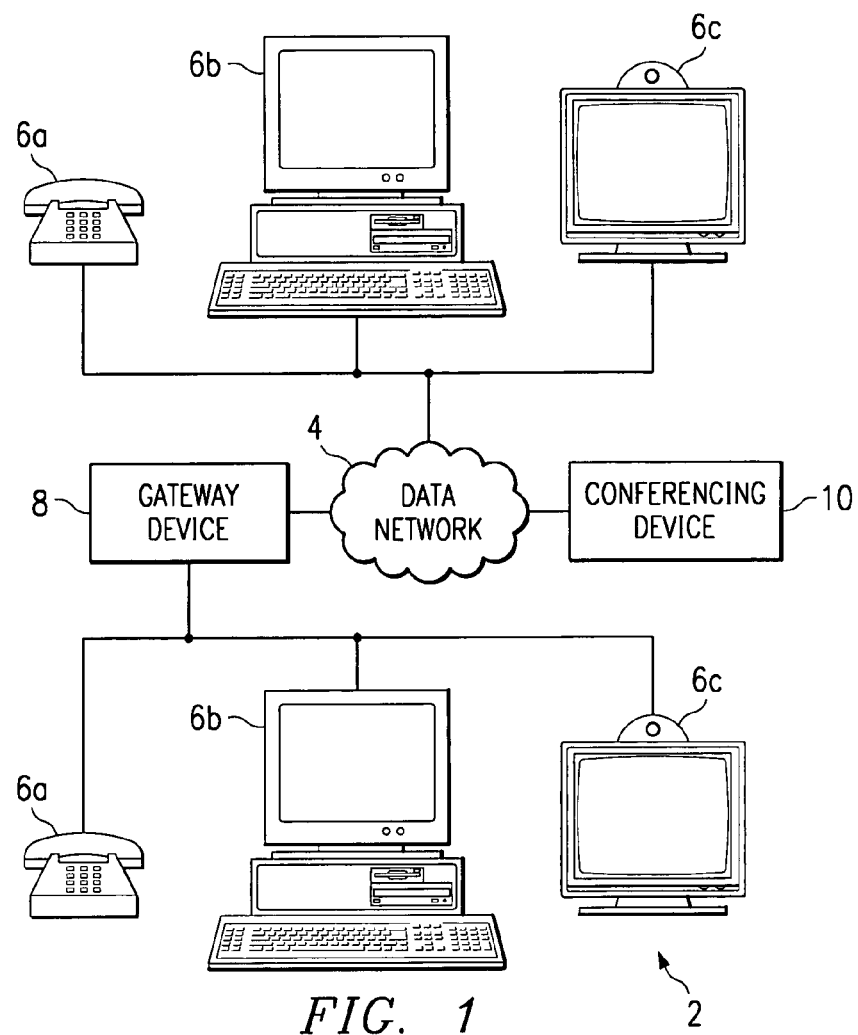
FIG. 1 illustrates a system that supports media conferences using a data network.

FIG. 1 illustrates a system that supports media conferences using a data network 4. A media conference is a real-time or near real-time communication among three or more participants. To establish and maintain media conferences, system 2 includes data network 4, end-user devices 6a, 6b, and 6c (collectively, end-user devices 6), gateway device 8, and conferencing device 10. Using media transformation processors and mixing processors, conferencing device 10 allows participants in a media conference to share media information in a real-time or near real-time environment.

Data network 4 communicates data streams between end-user devices 6 and conferencing device 10. Specifically, data network 4 communicates data packets using an Internet protocol, an Ethernet protocol, an Asynchronous Transfer Mode (ATM) protocol, or any other suitable network protocol. Data network 4 may include a local-area network (LAN), a wide-area network (WAN), the Internet, or any other suitable packet-based network.

Each end-user device 6 provides a user interface for a conference participant. End-user device 6 receives audio, visual, or other sensory input from a conference participant and, in response, generates voice, image, picture, video, or other media information. End-user device 6 encodes media information to generate an data stream and communicates the data stream to conferencing device 10 using data network 4. Encoding may include transcoding, CODEC conversion, compression, or any other processing technique for generating an input data stream that represents voice, image, picture, video, or other media information. By encoding the media information, end-user device 6 may compress the media information into a fewer number of bits to facilitate efficient communication over data network 4. In a voice telephone conference, end-user device 6 may encode voice information according to G.711, G.723, G729, or any other voice coding or compression standard. After encoding the media information, end-user device 6 communicates the resulting data stream to conferencing device 10.

End-user device 6 also receives a data stream from conferencing device 10 and decodes the data stream to generate media information. Using voice, image, picture, video, or other media information from the data stream, end-user device 6 produces audio, visual, or other sensory output for a conference participant. In a particular embodiment, end-user device 6 may be a telephone device 6a, a computer 6b, video conferencing equipment 6c, or any other suitable processing or communications device.

To support a media conference, conferencing device 10 performs three basic operation. First, conferencing device 10 receives input data streams from participants' end-user devices 6 and decodes the input data streams to generate input media information. Second, conferencing device 10 mixes the input media information to generate output media information. Third, conferencing device 10 encodes the output media information to generate output data streams and communicates the output data streams to participants' end-user devices 6. Conferencing device 10 may be either a networked device or a component operating in conjunction with another networked device. In a particular embodiment, conferencing device 10 is a circuit board coupled to a backplane in a data communications device.

In a particular embodiment, end-user devices 6 are coupled to data network 4 by wireless, wireline, or other suitable communication paths. End-user devices 6 communicate data streams to conferencing device 10 by encapsulating the data streams in data packets and communicating the data packets to data network 4. End-user devices 6 also receive data packets from data network 4 and process the data packets to reconstruct the data streams generated by conferencing device 10.

In an alternative embodiment, a gateway device 8 links end-user devices 6 to data network 4. Gateway device 8 receives data streams from end-user devices 6, encapsulates the data streams into data packets, and communicates the data packets to conferencing device 10 using data network 4. Gateway device 8 also receives data packets from data network 4, processes the data packets to reconstruct data streams generated by conferencing device 10, and communicates the data streams to end-user devices 6.

Figure 2:
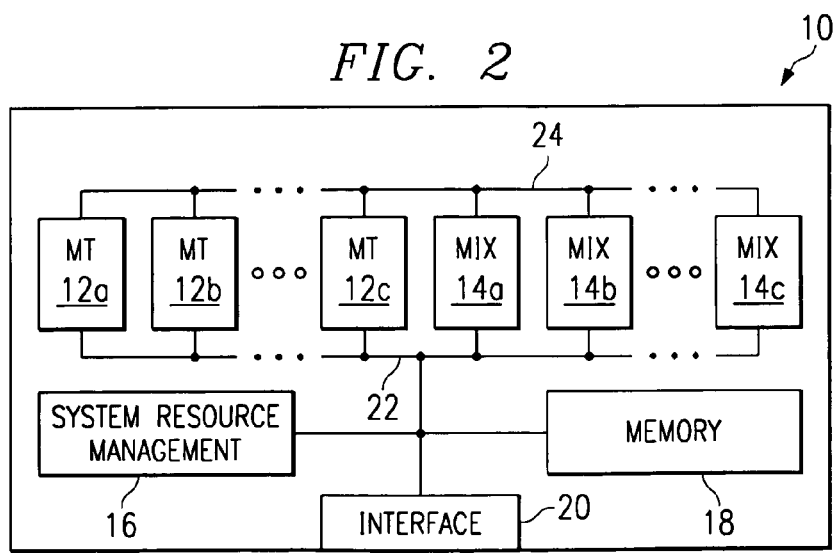
FIG. 2 illustrates a conferencing device that includes media transformation processors and mixing processors for supporting a media conference.

FIG. 2 illustrates in more detail conferencing device 10. As described above, conferencing device 10 performs three basic operations to support a media conference:

(1) decoding input data streams to generate input media information;
(2) mixing input media information to generate output media information; and
(3) encoding the output media information to generate output data streams.

Decoding may include transcoding, CODEC conversion, decompression, or any other processing that converts an input data stream into a format that facilitates mixing the data stream with other data streams. Mixing may include combining participants' input media information into a single stream of output media information, synchronizing different types of media information, copying a participant's input media information for communication to other participants, or any other processing that enables participants in a media conference to share media information with one another. Encoding may include transcoding, CODEC conversion, compression, or any other processing that converts output media information into a format for use by end-user devices 6. Conferencing device 10 does not necessarily perform all three operations to support a media conference. For example, in a particular embodiment, conferencing device 10 may not decode an input data stream to facilitate mixing the data stream with other data streams.

To perform these operations, conferencing device 10 includes media transformation processors 12a, 12b, and 12c (collectively, media transformation processors 12), mixing processors 14a, 14b, and 14c (collectively, mixing processors 14), and a system resource management (SRM) module 16. SRM module 16 assigns the various decoding, mixing, and encoding operations to media transformation processors 12 and mixing processor 14. By assigning decoding or encoding operations to media transformation processors 12, SRM module 16 relieves the burden of supporting a media conference from a single mixing processor 14. With this multi-processor solution, conferencing device 10 avoids restricting the size of a media conference based on the limited resources of any single processor. In addition, conferencing device 10 may devote greater resources to a media conference and, as a result, support more processing-intensive coding standards that facilitate communication of data streams over the data network 4. Interface 20 couples conferencing device 10 to data network 4.

Media transformation processors 12 and mixing processors 14 represent separate hardware components. The functionality described below may be implemented using separate hardware components or software that executes using the separate hardware components. Thus, media transformation processor 12 and mixing processor 14 do not operate using the same actual physical computing machinery. Media transformation processors 12 and mixing processors 14 may represent separate microprocessors, controllers, digital signal processors (DSPs), or other integrated circuit chips mounted to a circuit board. Alternatively, media transformation processors 12 and mixing processors 14 may represent separate networks of electronic components, such as transistors, diodes, resistors, etc., and their interconnections etched or imprinted on a single chip. In such an embodiment, media transformation processors 12 and mixing processors 14 may use shared resources but generally rely on separate pipelines to perform the majority of their processing. Although media transformation processors 12 and mixing processors 14 represent separate hardware components, the hardware components are not necessarily different in type. In a particular embodiment, media transformation processors 12 and mixing processors 14 are implemented using the same type of digital signal processors.

Media transformation processors 12 may receive input data streams from participants' end-user devices 6, decode the input data streams to generate input media information, and communicate the input media information to mixing processors 14. SRM module 16 assigns a participant's input data stream to media transformation processor 12 and communicates data packets associated with the participant to media transformation processor 12. Using the data packets, media transformation processor 12 reconstructs the input data stream generated by the participant's end-user device 6. Specifically, media transformation processor 12 may resequence the received data packets, insert replacement data packets for any missing data packets, or otherwise rehabilitate the media stream.

Because the data packets are transmitted individually over data network 4, they may travel different paths from end-user device 6 to conferencing device 10. As a result, although the data packets are typically transmitted sequentially from the same location, they may arrive at conferencing device 10 out of order due to different communication delays associated with different communication paths in data network 4. The data packets, however, include identifiers that indicate their proper order. Using the identifiers, media transformation processor 12 resequences the received data packets to place the packets in their proper order. When media transformation processor 12 receives data packets, media transformation processor 12 may store the data packets in order of receipt in a jitter buffer and then later sort the stored data packets to resequence the data packets. Alternatively, when media transformation processor 12 receives data packets, media transformation processor 12 may initially store the received data packets in their proper sequence according to data packets already stored in a jitter buffer. The latter embodiment avoids the need to later sort the data packets stored in the jitter buffer.

After re-sequencing the received data packets, media transformation processor 12 may insert replacement data packets for any missing data packets. By examining the identifiers of the resequenced data packets, media transformation processor 12 identifies missing data packets. If media transformation processor 12 does not receive a missing data packet within a threshold period of time, media transformation processor 12 inserts a replacement data packet in place of the missing data packet. The threshold period of time allows media transformation processor 12 a limited amount of time in which to receive the missing data packet without impairing the real-time quality of the media conference. After expiration of the threshold period of time, media transformation processor 12 continues decoding the input data stream with a replacement data packet to maintain the real-time quality of the media conference. In a particular embodiment, media transformation processor 12 regenerates the missing packet based on information included in preceding data packets, succeeding data packets, or both preceding and succeeding data packets. Alternatively, media transformation processor 12 may insert a null data packet in place of the missing data packet.

After reconstructing the input data stream from the data packets, media transformation processor 12 decodes the input data stream to generate input media information. As described above with reference to FIG. 1, end-user devices 6 typically encode input media information to form a data stream for communication over data network 4. Media transformation processor 12 decodes the input data stream to regenerate the input media information. Specifically, media transformation processor 12 identifies the coding standard used by the participant's end-user device 6, extracts the data from the data packets, and processes the data according to the identified coding standard. To identify the coding standard, media transformation processor 12 may examine coding information included in the input data stream, receive coding information from SRM module 16, or retrieve coding information from memory 18. Media transformation processor 12 communicates the resulting input media information to one of mixing processors 14.

In addition to decoding input data streams, media transformation processors 12 may also receive output media information from mixing processors 14, encode the output media information to generate output data streams, and communicate the output data streams to participants' end-user devices 6. SRM module 16 assigns an output data stream to media transformation processor 12, and in response, media transformation processor 12 receives from mixing processor 14 output media information associated with the participant. Media transformation processor 12 encodes the output media information for communication over data network 4. By encoding the output media information, media transformation processor 12 may compress the output media information into fewer number of bits to facilitate communication over data network 4. In a voice telephone conference, media transformation processor 12 may encode input voice information according to G.711, G.723, G.729, or any other voice coding or compression standard.

In a particular embodiment, conferencing device 10 identifies a coding standard used by a participant's end-user device 6 and encodes output media information for communication to the participant's end-user device 6 using the identified coding standard. In such an embodiment, media transformation processors 12 uses coding information to identify the coding standard used by the participant's end-user device 6. Media transformation processor 12 may retrieve coding information from memory 18, examine coding information included with the output media information, or receive a separate stream of coding information from another media transformation processor 12, mixing processor 14, or SRM module 16. Using the coding information, media transformation processor 12 identifies the coding standard employed by the participant's end-user device 6 and encodes the output media information according to the identified coding standard. As a result, the participant's end-user device 6 may encode input media information to generate input data streams and decode output data streams to generate output media information using the same coding standard.

After encoding the output media information, media transformation processor 12 communicates the resulting output data stream to the participant's end-user device 6 using data network 4. Media transformation processor 12 encapsulates the output data streams into data packets according to a network protocol used by data network 4. Media transformation processor 12 then communicates the data packets to the conference participant's end-user device 6 using interface 20. In a particular embodiment, media transformation processor 12 encapsulates the output data stream into Internet Protocol (IP) data packets and, in turn, encapsulates the IP data packets into Ethernet frames. In another embodiment, media transformation processor 12 communicates the output data stream to another component, such as a host processor, and the other component encapsulates the output data stream into Internet Protocol (IP) data packets and, in turn, encapsulates the IP data packet into Ethernet frames.

Mixing processor 14 mixes input media information to generate output media information. Mixing processor 14 may receive input media information from media transformation processors 12. Alternatively, like media transformation processors 12, mixing processor 14 may receive input data streams from participants' end-user devices 6 and decode the input data streams to generate input media information. Mixing processor 14 mixes the input media information associated with two or more participants to generate output media information. For example, mixing processor 14 may mix input voice information from two or more participants to generate output voice information. If the media conference includes video information, mixing processor 14 may synchronize the video information with the output voice information. In a particular embodiment, a participants selects one or more participants, and mixing processor 14 synchronizes or otherwise formats the video information from the selected participants. Similarly, mixing processor 14 may also enable participants to share other media information. For example, when sharing a spreadsheet, a word processing document, a whiteboard presentation, or other software application information, mixing processor 14 copies the input media information to generate output media information for each of the conference participants. After generating the output media information, mixing processor 14 may communicate the output media information to a media transformation processor 12 for encoding and communication to conference participants. Alternatively, like media transformation processors 12, mixing processor 14 may encode the output media information to generate output data streams and communicate the output data streams to participants' end-user devices 6

In a particular embodiment, mixing processor 14 generates different output media information for different participants in a media conference. For example, in a voice telephone conference, mixing processor 12 generates output voice information for each speaking participant by mixing the input voice information associated with the other speaking participants but not his or her own input voice information. Mixing processor 14 generates output voice information for each non-speaking participant by mixing the input voice information associated with all of the speaking participants. As a result, the non-speaking participants receive the same output media information, but speaking participants receive different output media information.

SRM module 16 allocates media conferences to media transformation processors 12 and mixing processors 14 and, accordingly, stores status information relating to the media conferences in memory 18. SRM module 16 may be implemented using hardware, software stored in a computer readable medium, or a combination of both hardware and software. In a particular embodiment, SRM module 16 is a single processor or multiple processors that communicate with one another. When conference participants create a new media conference, SRM module 16 receives initiation information indicating a number of participants in the media conference. SRM module 16 selects one of mixing processors 14 to support the media conference. As described above, mixing processor 14 mixes input media information associated with the conference participants to generate output media information. SRM module 16 may also assign selected mixing processor 14 the tasks of decoding input data streams to generate the input media information and encoding the output media information to generate output data streams. Alternatively, to provide multi-processor support for the media conference, SRM module 16 assigns some or all of the decoding and encoding operations to media transformation processors 12. SRM module 16 may assign the task of decoding a participant's input data stream and the task of encoding output media information for communication to the participant to the same or different media transformation processors 12. As described in further detail below with reference to FIG. 3, SRM module 16 may use media transformation processors 12 and mixing processors 14 in many different arrangements.

In response to assigning decoding, mixing, and encoding tasks to media transformation processors 12 and mixing processors 14, SRM module 16 stores status information relating to the media conference in memory 18. As described in further detail below with reference to FIG. 4, the status information identifies media transformation processors 12 and mixing processors 14 assigned the tasks of decoding, mixing, and encoding for each participant in the media conference. In addition, the status information may include coding information identifying a coding standard used by each participant's end-user device 6. Although memory 18 appears external from SRM module 16 in FIG. 2, memory 18 may be internal to or external from SRM module 16 according to particular needs.

To control communication among media transformation processors 12 and mixing processors 14, SRM module 16 communicates control information to media transformation processors 12 and mixing processors 14. If SRM module 16 assigns media transformation processor 12 the task of decoding an input data stream, SRM module 16 communicates to media transformation processor 12 control information identifying mixing processor 14, so that media transformation processor 12 communicates to mixing processor 14 the input media information generated by decoding the input data stream. Similarly, if SRM module 16 assigns media transformation processor 12 the task of encoding output media information, SRM module 16 may communicate to mixing processor 14 control information identifying media transformation processor 12, so that mixing processor 14 communicates the output media information to media transformation processor 14. SRM module 16 may communicate the control information with the input data stream or as part of a separate data stream. Alternatively, as described below with reference to FIG. 4, media transformation processors 12 and mixing processors 14 may use the status information stored in memory. 18 to communicate media information to one another.

After allocating the new media conference to media transformation processors 12 and mixing processors 14, SRM module 16 receives input data packets associated with the new media conference and communicates the input data packets to media transformation processors 12 or mixing processors 14. Specifically, SRM module 16 receives a data packet using interface 20, identifies a conference participant associated with the data packet, and communicates the data packet to media transformation processor 12 or mixing processor 14 assigned the task of decoding input data streams associated with the identified conference participant. In a particular embodiment, SRM module 16 examines the source address of the data packet and identifies one of media transformation processors 12 or mixing processors 14 associated with the source address according to the status information stored in memory 18. Because the source address of the data packet identifies end-user device 6 that generated the data packet, SRM module 16 may use the source address to identify a conference participant associated with the data packet and to communicate the data packet to media transformation processor 12 or mixing processor 14 also associated with the conference participant.

Media transformation processors 12 and mixing processors 14 communicate with SRM module 16, memory 18, and interface 20 using link 22. Link 22 may be a shared or dedicated communication path that supports serial, parallel, or any other suitable form of communication. In a particular embodiment, link 22 is a shared medium, such as a bus, and media transformation processors 12 and mixing processors 14 communicate intermediate media information to one another using an inter-processor link 24 to avoid overburdening bus 22.

Figure 3:
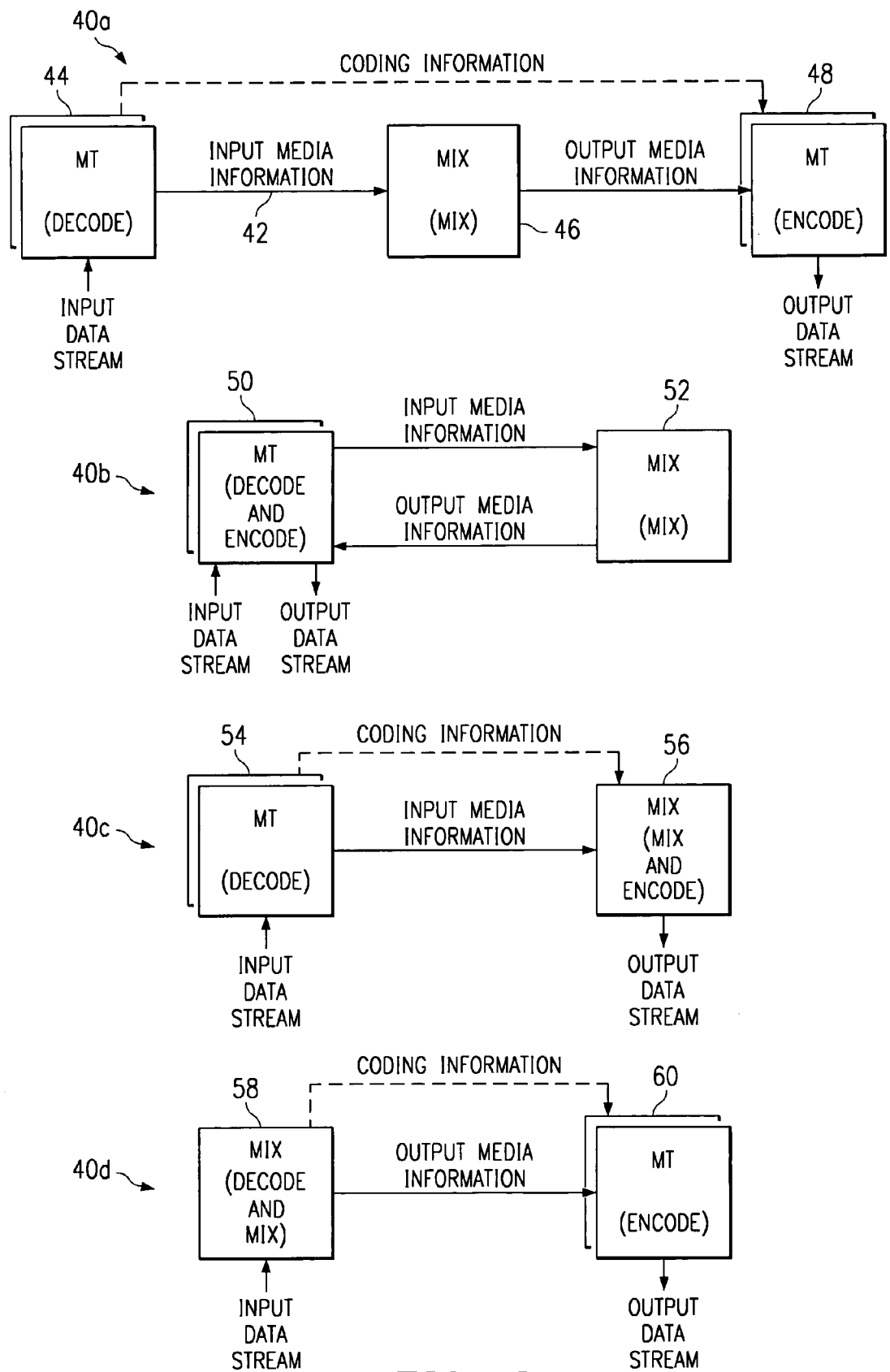
FIG. 3 illustrates different methods of using the media transformation processors and mixing processors to support a media conference.

FIG. 3 illustrates different methods of using media transformation processors 12 and mixing processors 14 to support a media conference. To support a media conference, conferencing device 10 uses media transformation processors 12 and mixing processors 14 to perform the basic decoding, mixing and encoding operations. In diagrams 40*a*, 40*b*, 40*c*, and 40*d* (collectively, diagrams 40), media transformation processors 12 are labeled "MT," and mixing processors 14 are labeled "MIX." Underneath these labels, diagrams 40 identify the basic operations—"DECODE," "MIX," and "ENCODE"—assigned to media transformation processors 12 and mixing processors 14. Links 42 represent information or data communicated to or from media transformation processors 12 and mixing processors 14, and labels "INPUT DATA STREAM," "INPUT MEDIA INFORMATION," "OUTPUT MEDIA INFORMATION," "OUTPUT DATA STREAMS," and "CODING INFORMATION" indicate the types of information communicated to and from media transformation processors 12 and mixing processors 14. Using any of the arrangements illustrated in diagrams 40 (or various combinations of the illustrated arrangements), SRM module 16 may assign decoding and encoding operations to media transformation processors 12 and relieve mixing processor 14 of some of the burden of supporting a media conference.

In diagram 40*a*, SRM module 16 assigns the decoding and encoding operations to separate media transformation processors 44 and 48. First media transformation processors 44 receive input data streams from participants' end-user devices 6, decode the input data streams to generate input media information, and communicate the input media information to a mixing processor 46. Mixing processor 46 receives the input information from first media transformation processors 44, mixes the input media information to generate output media information, and communicates the output media information to second media transformation processors 48. Second media transformation processors 48 receive the output media information, encode the output media information to generate output data streams, and communicate the output data streams to the participants' end-user devices 6.

In a particular embodiment, second media transformation processors 48 identifies a coding standard used by a participant's end-user device 6 and encodes output media information for communication to the participant's end-user device 6 using the identified coding standard. Media transformation processor 12 uses coding information to identify the coding standard used by the participant's end-user device 6. Media transformation processor 12 may retrieve coding information from memory 18, examine coding information included with the output media information, or receive coding information from first media transformation processor 44 or SRM module 16. In a particular embodiment, when first media transformation processor 44 decodes an input data stream received from the participant, first media transformation processor 44 identifies the coding standard used by the participant's end-user device 6, generates coding information identifying the participant's coding standard, and communicates the coding information to second media transformation processor 48. Second media transformation processor 48 encodes output media information for communication to the participant using the coding standard identified by the coding information. As a result, the participant's end-user device 6 may decode the output data streams using the same coding standard employed to encode input media information.

In diagram 40*b*, SRM module 16 assigns both the decoding and encoding operations for the participants to the same media transformation processors 50. Media transformation processors 50 receive input data streams from participants' end-user devices 6, decode the input data streams to generate input media information, and communicate the input media information to a mixing processor 52. Mixing processor 52 receives the input information from media transformation processors 50, mixes the input media information to generate output media information, and communicates the output media information to media transformation processors 50. Media transformation processors 50 receive the output media information, encode the output media information to generate output data streams, and communicate the output data streams to the participants' end-user devices 6. Because, unlike the embodiment illustrated in diagram 40*a*, media transformation processors 50 may decode an input data stream received from a participant and also encode output media information for communication to the same participants, media transformation processors 50 may identify a coding standard used by the participant based on the input data stream and encode the output media information using the identified coding standard.

In diagram 40*c*, SRM module 16 assigns the decoding operation to media transformation processors 54. Media transformation processors 54 receive input data streams from participants' end-user devices 6, decode the input data streams to generate input media information, and communicate the input media information to a mixing processor 56. Mixing processor 56 receives the input information from first media transformation processors 50, mixes the input media information to generate output media information, encodes the output media information to generate output data streams, and communicates the output data streams to the participants' end-user devices 6. In a particular embodiment, media transformation processors 54 communicate to mixing processor 56 coding information identifying the coding standards used by the participants' end-user devices 6, and mixing processor 56 encodes the output media information for each participant using the identified coding standards. Media transformation processors 54 may communicate the coding information with the input media information or in a separate stream of information.

In diagram 40*d*, SRM module 16 assigns the encoding operation to media transformation processors 12. Mixing processor 58 receives input data streams from participants' end-user devices 6, decodes the input data streams to generate input media information, mixes the input media information to generate output media information, and communicates the output media information to media transformation processors 60. Media transformation processors 60 receive the output media information, encode the output media information to generate output data streams, and communicate the output data streams to the participants' end-user devices 6. In a particular embodiment, mixing processor 58 communicates to media transformation processors 60 coding information identifying the coding standards used by the participants' end-user devices 6, and media transformation processors 60 encodes the output media information for each participant using the identified coding standards. Mixing processor 58 may communicate the coding information with the output media information or in a separate stream of information.

Diagrams 40 demonstrate particular methods of using media transformation processors 12 and mixing processors 14 to support a media conference. Conferencing device 10 may combine two or more of the methods demonstrated in diagrams 40 to support a media conference in many alternative ways. For example, conferencing device 10 may use all four methods to support a media conference that includes four participants. As illustrated in first diagram 40a, separate media transformation processors 12 may perform the decoding and encoding operations for a first conference participant. As illustrated in second diagram 40b, one media transformation processor 50 may perform both the decoding and encoding operation for a second conference participant. For the third and fourth conference participants, the encoding and decoding operation may be split between media transformation processors 12 and mixing processor 14 as illustrated in third and fourth diagrams 40c and 40d. Using any of the arrangements illustrated in diagrams 40 or various combinations of the illustrated arrangements, SRM module 16 may assign decoding and encoding operations to media transformation processors 12. With this multi-processor solution, conferencing device 10 may avoid restricting the size of a media conference based on the limited resources of any single processor. In addition, conferencing device 10 may devote greater resources to a media conference and, as a result, support more processing-intensive coding standards that facilitate communication of data streams over the data network 4.

FIG. 4 illustrates a table 70 that includes status information relating to the media conferences supported by conferencing device 10. The status information relates to the assignment of decoding, mixing, and encoding operations to media transformation processors 12 and mixing processors 14. In addition, the status information includes coding information identifying a coding standard used by each participant's end-user device 6. As described above, SRM module 14 may store the status information in memory 18. Although FIG. 4 is a table for purposes of illustration, memory 18 may store status information using any suitable data structures and may maintain associations between the data structures using arrays, linked lists, pointers, or any other suitable programming techniques.

A first column 72 lists media conference identifiers for the media conferences supported by conferencing device 10. Using participant identifiers, second column 74 associates each media conference identified in first column 72 with the participants included in the associated media conference. In the illustrated embodiment, the participant identifiers are EP addresses (shown in dotted decimal notation) assigned to the participants' end-user devices 6. Using processor identifiers, third column 76 associates each participant identified in second column 74 with one of media transformation processors 12 or mixing processors 14 that decodes input data streams received from the associated participant. Using processor identifiers, fourth column 78 associates each media conference identified in first column 72 with one of mixing processors 14 that performs the mixing for the associated media conference. Using processor identifiers, fifth column 80 associates each conference participant identified in second column 74 with one of media transformation processors 12 or mixing processors 14 that encodes output media information for communication to the associated participant. Sixth column 82 associates each participant identified in second column 74 with a coding standard used by each participant's end-user device 6. SRM module 16 may use numbers, letter, addresses, or any other suitable information to identify media conferences, conference participants, media transformation processors 12, mixing processors 14, or coding standards.

SRM module 16 uses the status information stored in table 70 to support the media conferences allocated to DSPs 12. For example, SRM module 16 may use the status information to communicate input data packets to appropriate media transformation processors 12 and mixing processors 14 in conferencing device 10. In response to receiving an input data packet from interface 20, SRM module 16 may examine the data packet's source address, identify a conference participant associated with the source address using second column 74, identify media transformation processor 12 or mixing processor 14 associated with the conference participant using third column 76, and communicate the input packet to identified media transformation processor 12 or mixing processor 14 for decoding.

In a particular embodiment, media transformation processors 12 and mixing processors 14 use the status information stored in table 70 to communicate media information to one another. For example, when media transformation processor "1" receives an input data stream associated with participant "15.2.48.147," media transformation processor "1" decodes the input data stream to generate input media information, identifies mixing processor "2" as associated with the participant using columns 74 and 78 in table 70, and communicates the input media information to identified mixing processor "2." Similarly, when mixing processor "2" generates output media information for communication to participant "15.2.48.147," mixing processor "2" identifies media transformation processor "1" as associated with the participant using columns 74 and 80 and communicates the output media information to identified media transformation processor "1." Rather than use the status information stored in memory 18, media transformation processors 12 and mixing processors 14 may communicate media information to one another according to control information received from SRM module 16, as described above with reference to FIG. 2.

In a particular embodiment, media transformation processors 12 and mixing processors 14 use the status information stored in table 70 to decode input data streams and encode output media information. For example, when media transformation processor "1" receives an input data stream associated with participant "15.2.48.147," media transformation processor "1" identifies G.711 as the coding standard associated with the participant using columns 74 and 82 in table 70 and decodes the input data stream according to the G.711 standard. Similarly, when media transformation processor "1" receives from mixing processor "2" output media information for communication to participant "15.2.48.147," media transformation processor "1" identifies G.711 as the coding standard associated with the participant using columns 74 and 82 in table 70 and encodes the output media information according to the G.711 standard. Rather than use the status information stored in memory 18, media transformation processors 12 may receive coding information with the input data streams and output media information or receive coding information from other media transformation processor 12 or SRM module 16.

Figure 5:
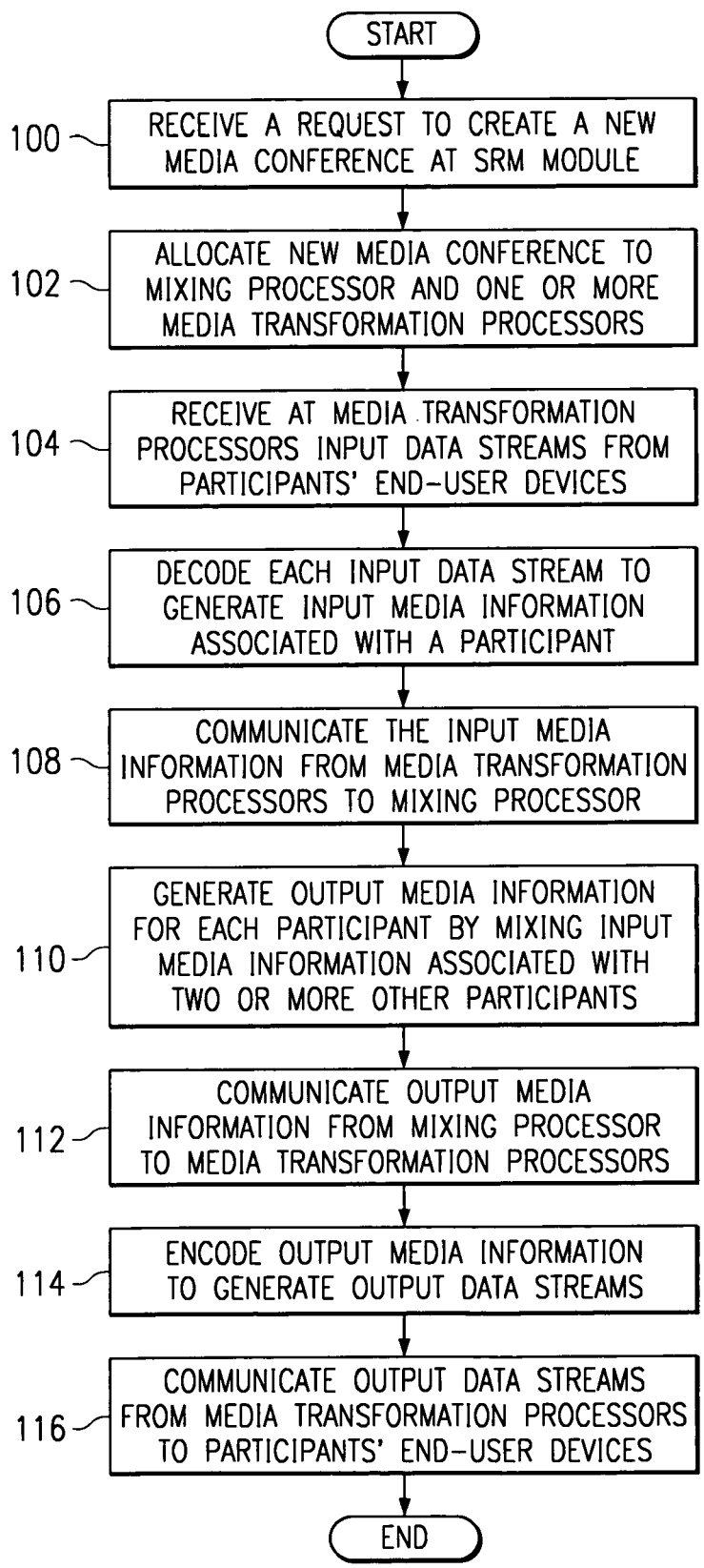
FIG. 5 illustrates a flowchart of a method of using media transformation processors and mixing processors to support a media conference.

FIG. 5 illustrates a flowchart of an exemplary method of using media transformation processors 12 and mixing processors 14 to support a media conference. The method begins at step 100, where SRM module 16 receives a request to create a new media conference. SRM module 16 allocates the new media conference to a mixing processor 14 and one or more media transformation processors 12 at step 102. Media transformation processors 12 receive input data streams from participants' end-user devices 6 at step 104, decode each input data stream to generate input media information at step 106, and communicate the input media information to mixing processor 14 at step 108. At step 110, mixing processor 14 generates output media information for each conference participant by mixing the input media information associated with two or more other participants. Mixing processor 14 communicates the output media information to media transformation processors 12 at step 112. Media transformation processors 12 encode the output media information to generate output data streams at step 114 and communicate the output data streams to participants' end-user devices 6 at step 116, and the method ends. FIG. 5 illustrates only a particular method of using media transformation processors 12 and mixing processors 14 to support a media conference. As described above with reference to FIG. 3, SRM module 16 may use media transformation processors 12 and mixing processors 14 in many different arrangements.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus for using a plurality of processors to support a media conference, comprising:
    a system resource management (SRM) module coupled to one or more mixing processors and a plurality of media transformation processors, the SRM module operable to receive a request to support a media conference and, in response, to allocate the media conference to at least a first mixing processor and a first media transformation processors the SRM module further operable to communicate to the mixing processor control information identifying the first media transformation processor;
    wherein the first mixing processor is operable to mix input media information associated with two or more first participants to generate output media information for communication to a second participant, wherein the first mixing processor communicates the output media information to the first media transformation processor identified by the control information received from the SRM module;
    wherein the first media transformation processor is coupled to the mixing processor and operable to receive the output media information from the mixing processor, to encode the output media information to generate an output data stream, and to communicate the output data stream to the second participant's end-user device;
    wherein the mixing processor and the first media transformation processor are separate hardware components.

2. The apparatus of claim 1, further comprising a second media transformation processor coupled to the first mixing processor, the second media transformation processor operable to receive an input data stream from a first participant's end-user device, to decode the input data stream to generate input media information associated with the first participant, and to communicate the input media information associated with the first participant to the first mixing processor.

3. The apparatus of claim 1, wherein the first media transformation processor is further operable to receive an input data stream from the second participant's end-user device, to decode the input data stream to generate input media information associated with the second participant, and to communicate the input media information associated with the second participant to the first mixing processor.

4. The apparatus of claim 1, wherein the first mixing processor is further operable to receive an input data stream from a first participant's end-user device and to decode the input data stream to generate input media information associated with the first participant.

5. The apparatus of claim 1, wherein the first mixing processor and the first media transformation processor are separate integrated circuits.

6. The apparatus of claim 1, wherein the first mixing processor and the first media transformation processor are separate digital signal processors (DSPs).

7. The apparatus of claim 1, wherein the media conference is a voice telephone conference and the media information is voice information.

8. A method for using a plurality of processors to support a media conference, comprising:
    receiving a request to support a media conference;
    assigning a mixing processor a task of mixing input media information associated with two or more first participant to generate output media information;
    assigning a first media transformation processor a task of encoding the output media information to generate an output data stream for communication to a participant in the media conference;
    communicating to the mixing processor control information identifying the first media transformation processor;
    mixing the input media information associated with the first participants to generate the output media information for communication to the second participant using a the mixing processor;
    communicating the output media information from the mixing processor to the first media transformation processor, wherein the mixing processor and the first media transformation processor are separate hardware components;
    encoding the output media information to generate the output data stream using the first media transformation processor; and
    communicating the output data stream from the first media transformation processor to the second participant's end-user device.

9. The method of claim 8, further comprising:
    receiving at a second media transformation processor an input data stream from a first participant's end-user device;
    decoding the input data stream to generate input media information associated with the first participant; and
    communicating the input media information associated with the first participant from the second media transformation processor to the mixing processor.

10. The method of claim 8, further comprising:
    receiving at the first media transformation processor an input data stream from the second participant's end-user device;
    decoding the input data stream to generate input media information associated with the second participant;
    communicating the input media information associated with the second participant from the first media transformation processor to the mixing processor; and mixing the input media information associated with the second participant with input media information from one or more other participants to generate output media information for communication to a first participant.

11. The method of claim 8, further comprising:
receiving at the mixing processor an input data stream from a first participant's end-user device; and
decoding the input data stream to generate input media information associated with the first participant.

12. The method of claim 8, wherein the mixing processor and the first media transformation processor are separate integrated circuits.

13. The method of claim 8, wherein the mixing processor and the first media transformation processor are separate digital signal processors (DSPs).

14. The method of claim 8, wherein the media conference is a voice telephone conference and the media information is voice information.

15. A system for using a plurality of processors to support a media conference, comprising:
   a plurality of end-user devices coupled to a data network and operable to generate input media information, to encode the input media information to generate input data streams, and to communicate the input data streams using the data network; and
   a conferencing device coupled to the data network, the conferencing device comprising:
      a system resource management (SRM) module coupled to one or more mixing processors and a plurality of media transformation processors, the SRM module operable to receive a request to support a media conference and, in response, to allocate the media conference to at least a first mixing processor and a first media transformation processor, the SRM module further operable to communicate to the mixing processor control information identifying the first media transformation processor;
      wherein the first a mixing processor is operable to mix input media information associated with two or more first participants to generate output media information for communication to a second participant;
      wherein the first mixing processor communicates the output media information to the first media transformation processor identified by the control information received from the SRM module;
      wherein the first media transformation processor coupled to the mixing processor and operable to receive the output media information from the mixing processor, to encode the output media information to generate an output data stream, and to communicate the output data stream to the second participant's end-user device.
   wherein the mixing processor and the first media transformation processor are separate hardware components.

16. The system of claim 15, wherein the conferencing device further comprises one or more media transformation processors operable to decode the input data streams to generate the input media information.

17. The system of claim 15, wherein the conferencing device is further operable to identify a coding standard used by a participant's end-user device to encode output media information for communication to the participant's end-user device using the identified coding standard.

18. The system of claim 15, wherein the first mixing processor and the first media transformation processor are separate integrated circuits.

19. The system of claim 15, wherein the first mixing processor and the first media transformation processor are separate digital signal processors (DSPs).

20. The system of claim 15, wherein the media conference is a voice telephone conference and the media information is voice information.

21. The apparatus of claim 1, wherein
the SRM module is further operable to allocate the media conference to a second media transformation processor that decodes an input data stream received from a participant in the media conference to generate input media information;
the SRM module is further operable to communicate to the second media transformation processor control information identifying the first mixing processor; and
the second media transformation processor uses the control information to communicate the generated input media information to the first mixing processor.

* * * * *